United States Patent
Bulman et al.

(10) Patent No.: US 8,056,319 B2
(45) Date of Patent: Nov. 15, 2011

(54) COMBINED CYCLE MISSILE ENGINE SYSTEM

(75) Inventors: Melvin J. Bulman, Orangevale, CA (US); Adam Siebenhaar, Shingle Springs, CA (US)

(73) Assignee: Aerojet—General Corporation, Sacramento, CA (US)

( * ) Notice: Subject to any disclaimer, the term of this patent is extended or adjusted under 35 U.S.C. 154(b) by 1011 days.

(21) Appl. No.: 11/983,244

(22) Filed: Nov. 8, 2007

(65) Prior Publication Data

US 2009/0205311 A1      Aug. 20, 2009

Related U.S. Application Data

(60) Provisional application No. 60/858,032, filed on Nov. 10, 2006.

(51) Int. Cl.
*F02K 9/72* (2006.01)
*F02K 9/28* (2006.01)

(52) U.S. Cl. .............. 60/225; 60/244; 60/251; 60/769

(58) Field of Classification Search .............. 60/225, 60/244, 245, 251, 797, 798, 769
See application file for complete search history.

(56) References Cited

U.S. PATENT DOCUMENTS

| | | | | |
|---|---|---|---|---|
| 2,918,220 A | * | 12/1959 | Crow | 239/231 |
| 3,173,249 A | | 3/1965 | Wiggins et al. | 60/35.6 |
| 3,279,187 A | * | 10/1966 | Lindman | 60/245 |
| 3,350,887 A | * | 11/1967 | Leunig et al. | 60/251 |
| 3,368,353 A | | 2/1968 | Allport | |
| 3,535,881 A | * | 10/1970 | Schubert | 60/245 |
| 3,555,826 A | | 1/1971 | Bennett, Jr. | 60/251 |
| 3,595,022 A | * | 7/1971 | Radebold et al. | 60/769 |
| 3,626,698 A | * | 12/1971 | Baum | 60/768 |
| 4,242,865 A | | 1/1981 | Harrison et al. | 60/242 |
| 4,651,523 A | | 3/1987 | Adams | 60/245 |
| 5,010,730 A | | 4/1991 | Knuth et al. | |
| 5,028,014 A | | 7/1991 | Anderson, Jr. et al. | 244/3.22 |
| 5,099,645 A | | 3/1992 | Schuler et al. | 60/219 |
| 5,152,136 A | * | 10/1992 | Chew et al. | 60/251 |
| 5,224,344 A | | 7/1993 | Keirsey et al. | 60/244 |
| 5,537,815 A | * | 7/1996 | Marguet et al. | 60/224 |

(Continued)

FOREIGN PATENT DOCUMENTS

| | | |
|---|---|---|
| JP | 8177629 | 7/1996 |
| JP | 8326604 A | 12/1996 |
| RU | 2274761 C2 | 8/2005 |
| RU | 2274761 | 4/2006 |

OTHER PUBLICATIONS

EP 07873472.0, Extended European Search Report, European Patent Office, Jun. 8, 2011.

(Continued)

*Primary Examiner* — Ted Kim
(74) *Attorney, Agent, or Firm* — Wiggin and Dana LLP; Gregory S. Rosenblatt

(57) ABSTRACT

An insensitive combined cycle missile propulsion system includes a solid fuel contained within a first section of the missile, a liquid oxidizer contained within a second section of the missile and a solid oxidizer contained within a third section of said missile. A first conduit has a first valve communicating the fuel and the oxidizer and a second conduit, spatially removed from the first conduit, has a second valve communicating the fuel and the oxidizer. An inlet system for delivering atmospheric oxygen for combustion with the fuel rich gases generated within the missile and a nozzle exhausts combustion products that result from combustion of the fuel, the liquid and solid oxidizers, and air.

3 Claims, 7 Drawing Sheets

U.S. PATENT DOCUMENTS

| | | | |
|---|---|---|---|
| 5,568,171 A | 10/1996 | Keefe et al. | 60/224 |
| 5,572,864 A | 11/1996 | Jones | 60/220 |
| 6,354,074 B1 | 3/2002 | Jones et al. | |
| 6,557,339 B2 * | 5/2003 | Demay et al. | 60/245 |
| 7,216,474 B2 | 5/2007 | Bulman et al. | 60/225 |
| 2005/0120703 A1 | 6/2005 | Rohrbaugh et al. | |
| 2005/0198940 A1 | 9/2005 | Koshoffer et al. | 60/204 |

OTHER PUBLICATIONS

RU 2009122187, Notification on Results of Patentability Check, Russian Patent Office, Feb. 21, 2011.

Summary of Non-Final Office Action issued by Japanese Patent Office on Jun. 21, 2011 for JP2009-536310.

* cited by examiner

VALVE SETTINGS
18a – OPEN
20a – CLOSED

VALVE SETTINGS
18a – OPEN
20a – OPEN

VALVE SETTINGS
18a – OPEN
20a – CLOSED

VALVE SETTINGS
18a – OPEN
20a – OPEN

VALVE SETTINGS
18a – OPEN
20a – CLOSED
39a – AS NEEDED

VALVE SETTINGS
40a - CLOSED
42a - OPEN

VALVE SETTINGS
40a - OPEN
42a - OPEN

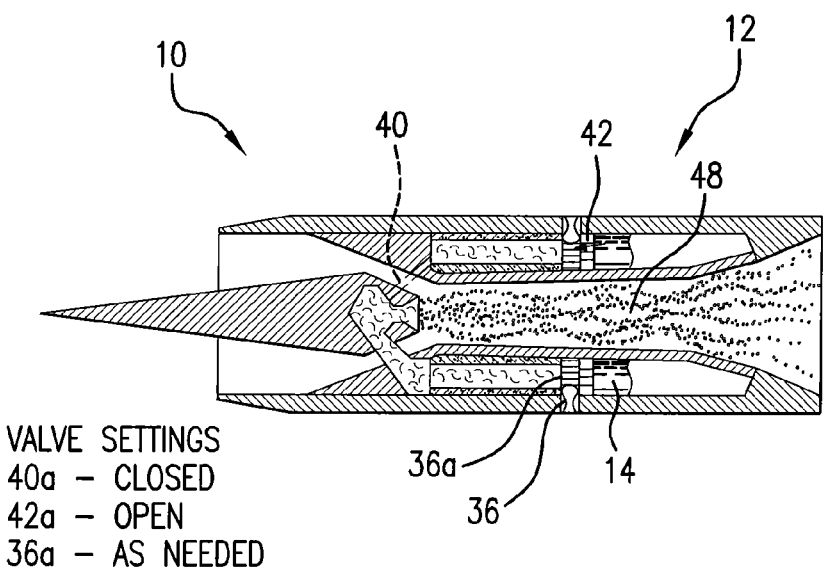
VALVE SETTINGS
40a — CLOSED
42a — OPEN
36a — AS NEEDED
FIG.13
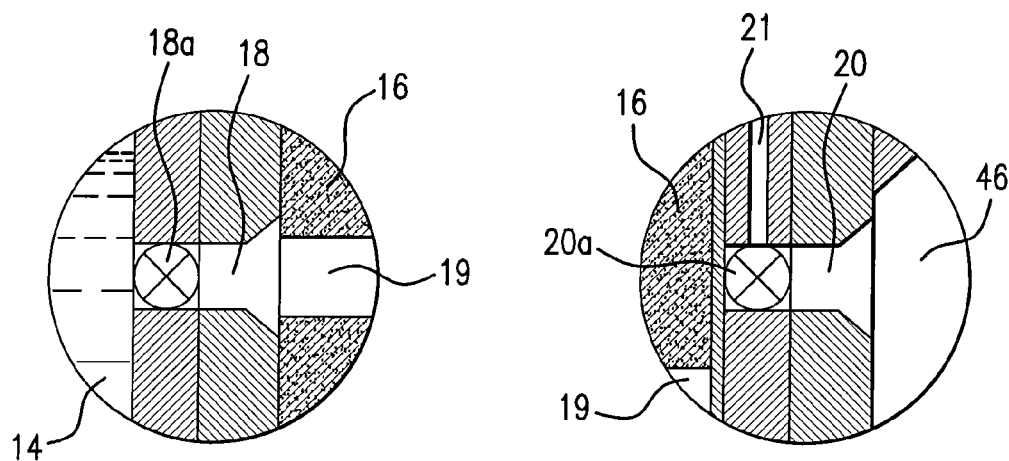
FIG.14
FIG.15

COMBINED CYCLE MISSILE ENGINE SYSTEM

CROSS REFERENCE TO RELATED APPLICATION(S)

This patent application claims priority to U.S. Provisional Patent Application Ser. No. 60/858,032 titled "Combined Cycle Missile Engine System" that was filed on Nov. 10, 2006. The subject matter of that provisional patent application is incorporated herein in its entirety.

U.S. GOVERNMENT RIGHTS

N.A.

BACKGROUND

1. Field

This invention relates to a propulsion system for a missile. More particularly, the invention relates to a system for separating and controlling oxidizer and fuel in an insensitive missile propulsion system, thereby enabling efficient operation in each one of the multiple modes of operation utilized by the missile during a flight.

2. Description of the Related Art

Conventional rocket propulsion systems to propel missiles have performance limitations imposed by a number of factors including a requirement to transport a required amount of oxidizer. For a given take-off mass this results in shorter range powered flights or reduced payloads relative to systems like ramjets and scramjets which obtain the oxidizer from atmospheric air. Ramjet and scramjet engines have their own limitations; including inadequate thrust at low speeds thereby requiring a rocket or turbine booster of significant mass to accelerate the missile to ramjet takeover speed. Further, since the oxidizer for the ramjet comes from the atmosphere, the ramjet fuel flow must be controlled during flight to maintain the proper fuel to oxidizer ratio which may vary greatly over the flight duration.

Variable cycle engines that transition from a rocket propulsion system at launch and relatively low speeds to a ramjet propulsion system at higher speeds are known from U.S. Pat. Nos. 4,651,523 and 5,224,344, both of which are incorporated by reference in their entireties herein. U.S. Pat. No. 4,651,523 discloses a dual cycle engine having a solid propellant with an aft end shaped to form a nozzle. As the propellant burns, the missile is propelled by rocket thrust. Burning of the propellant allows forwardly positioned air covers to slide rearward enabling compressed air to be delivered to a combustion chamber initiating ramjet operation. U.S. Pat. No. 5,224,344 discloses a rocket chamber replacing the ramjet pilot of a Dual Combustion Ramjet (DCR) engine. A mixture of liquid fuel and oxidizer combusted within the rocket engine initially propels the missile by rocket propulsion. As the speed increases, compressed air is delivered to the ramjet combustor through inlet passages and additional fuel is provided to the rocket engine delivering a fuel-rich exhaust to the combustor. Combustion of the fuel-rich exhaust heats and expands the compressed air enabling ramjet operation.

Most missiles today employ solid rocket propellants that contain an intimate mixture of fuel and oxidizer chemicals which when ignited produce a highly energetic stream of gas used effectively for propulsion. Liquid bi-propellant rocket systems separate the fuel and oxidizer until injected into the rocket motor but have a risk of leakage and fire if the tanks are breached by accident or enemy action. Accidental ignition of these propellant(s) can cause severe hazards for the user of the weapon. These hazards include explosion, fire or even uncommanded flight of the missile. The US Defense Department is demanding missile propulsion systems that are insensitive to accidental ignition that may occur during handling or at any time prior to the planned launch of the weapon. Systems that have reduced hazards are referred to as Insensitive Munitions or IM.

Hybrid engines having a solid component and a liquid component are one type of IM. When the fuel is liquid and the oxidizer solid, the engine is referred to as a reverse hybrid engine. One reverse hybrid engine is disclosed in U.S. Pat. No. 3,555,826, which is incorporated by reference in its entirety herein. The patent discloses an engine having the liquid fuel separated from a solid oxidizer by an electrically actuated mechanical valve.

There remains a need for an effective variable cycle engine capable of utilizing insensitive munitions for propulsion.

BRIEF SUMMARY

The details of one or more embodiments of the invention are set forth in the accompanying drawings and the description below. Other features, objects and advantages of the invention will be apparent from the description and drawings, and from the claims.

In accordance with a first embodiment of the invention, an insensitive combined cycle missile propulsion system includes a fuel contained within a first section of the missile and an oxidizer contained within a second section of the missile, where one of the fuel or oxidizer is a liquid until consumed during flight and the other is a solid until consumed during flight. A first conduit has a first valve communicating the fuel and the oxidizer and a second conduit, spatially removed from the first conduit, has a second valve communicating the fuel and the oxidizer. A rocket nozzle exhausts combustion products that result from combustion of the fuel and the oxidizer.

In accordance with a second embodiment of the invention, an insensitive combined cycle missile propulsion system includes a fuel contained within a first section of the missile and an oxidizer contained within a second section of the missile where one of the fuel or oxidizers is a liquid until consumed during flight and the other is a solid until consumed during flight. A first conduit has a first valve communicating the fuel and the oxidizer and a second conduit, spatially removed from the first conduit, has a second valve communicating the fuel and the oxidizer. A rocket nozzle downstream of the first valve and the second valve is effective to exhaust combustion products resulting from combustion of the fuel and the oxidizer into an after burner. An obstructed air inlet has a nose end and a body end with the body end terminating at the combustor.

BRIEF DESCRIPTION OF THE DRAWINGS

FIG. 13 illustrates the missile of FIG. 9 with the rocket engine in mono-propellant rocket divert mode of operation.

FIG. 14 illustrates an upstream liquid oxidizer valve.

FIG. 15 illustrates an downstream liquid oxidizer valve.

Like reference numbers and designations in the various drawings indicated like elements.

DETAILED DESCRIPTION

Disclosed herein is a high performance IM propulsion system with a very low hazard level for accidental activation. A first facet of this IM propulsion system is separation of the fuel and oxidizer so that combustion is not possible until they are intentionally mixed and ignited. A second facet of this IM propulsion system is that by using atmospheric oxygen for some of the propulsion, the system is inherently less sensitive and higher performing. This IM propulsion system in its various embodiments separates further the fuel and oxidizer used for rocket boost or assist functions to minimize its hazards. In addition, the fuel and some of the oxidizers are in a solid state so that they cannot leak out of the system and cause a fire hazard. The system is configured to operate with this IM arrangement throughout a variety of missions containing the elements of boost, acceleration, cruise, final dash and divert and attitude control (DAC) modes in the atmosphere or above it.

Separation of the fuel and oxidizer in a missile propulsion system enables a missile with greater performance and reduced sensitivity to accidents and enemy threats. This separation results in IM attributes and is achieved by employing hybrid rocket and airbreathing propulsion technologies. Combustion is only possible when the fuel and oxidizers are brought together and ignited. This can not occur by accident. Controlling the ratio of oxidizer to fuel allows both efficient rocket and airbreathing performance. This propulsion system is configured to operate in up to five modes:

A. Integral Reverse Hybrid Rocket for initial boost;
B. Air Augmented Hybrid Rocket for additional boost;
C. Ramjet/Scramjet for additional acceleration and cruise;
D. Dual Injected Hybrid Rocket for terminal propulsion; and
E. Mono-propellant Rocket for divert and attitude control.

All of these modes are controlled by small cold liquid valves and at most three different propellants: oxidizer-rich solid, fuel-rich solid, and liquid oxidizer.

Figure 1:
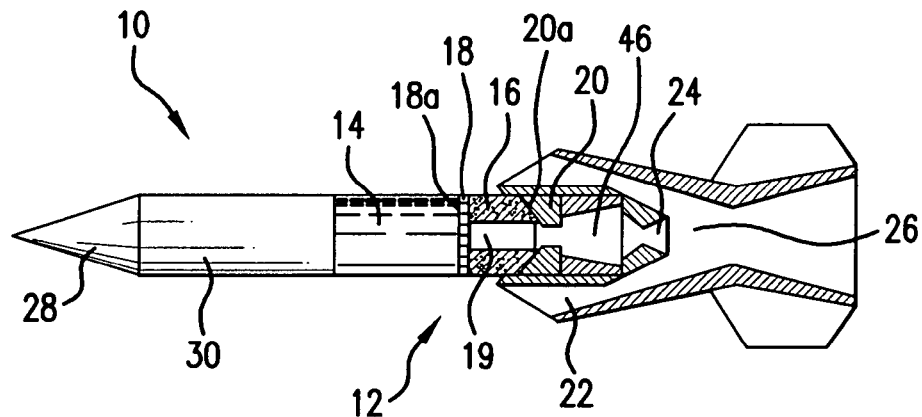
FIG. 1 illustrates a missile propelled by a dual injector hybrid air augmented rocket motor that is capable of operating in the multiple modes of the invention.

FIG. 1 illustrates a missile 10 propelled by a dual injector hybrid air augmented engine 12 that is capable of operating in the multiple modes of the invention. The engine 12 includes a liquid oxidizer 14 contained within a section of the missile. The liquid oxidizer 14 can be any suitable chemical with a positive oxygen balance capable of being maintained in a liquid state until reacted. Suitable chemicals for the liquid oxidizer 14 include hydrogen peroxide, nitrogen tetroxide, concentrated nitric acid and, preferably, hydroxylammonium nitrate (HAN). The fuel 16 is contained within a separate section of the missile and is any suitable solid fuel such as hydroxyl-terminated polybutadiene (HTPB).

The engine 12 includes two independently actuated valve systems 18a, 20a; upstream liquid oxidizer injector 18 and downstream liquid oxidizer injector 20. Each valve communicates liquid oxidizer through spatially separated conduits. Upstream and downstream are used to denote the position of the valves relative to the direction of flow of the reactants. FIG. 14 is an exploded view of an upstream valve 18a liquid oxidizer injector 18 combination. While any of the valve and injector combinations may be integrated into a single part, they are typically separate. Opening valve 18a enables liquid oxidizer 14 to be injected by the upstream liquid oxidizer injector 18 into center bore 19 of the fuel cylinder where it contacts the fuel 16.

FIG. 15 is an exploded view of a downstream valve 20a liquid oxidizer 20 combination. Opening valve 20a enables liquid oxidizer to flow via conduit 21 into downstream liquid oxidizer injector 20. The liquid oxidizer is injected into gas generator 46 where it reacts with uncombusted fuel.

Referring back to FIG. 1, the fuel 16 may be shaped as a hollow cylinder and the upstream liquid oxidizer injector 18 injects the liquid oxidizer 14 into a center bore 19 of the fuel cylinder. The engine 12 further includes air inlets 22, primary rocket nozzle 24 and afterburner 26. The functions of these engine components are described hereinbelow. In addition to the engine 12, the missile 10 typically further includes a nose 28 and front end 30. Front end 30 typically houses the guidance and control systems as well as a warhead.

Advantages of hybrid engine 12 over prior art hybrid rocket motors are manifold. The engine can operate in up to five modes of operation with high performance in each as will be described in more detail. These benefits are achieved by employing both upstream 18 and downstream 20 liquid oxidizer injectors. The upstream liquid oxidizer injector 18 causes the regression of the solid fuel as in a prior art hybrid rocket motor. This regression rate is not proportional to the oxidizer flow and varies further as the port regresses away from its initial geometry. In the prior art, this results in an undesirable variation in the fuel to oxidizer ratio. In rocket operation, Specific Impulse (Isp), the thrust per pound of propellant flowrate and the main measure of rocket efficiency, is maximized with a fuel to oxidizer ratio very close to stoichiometric. As a result, the prior art hybrid rocket motor has less than optimum efficiency.

In the dual injector hybrid engine 12, the downstream liquid oxidizer injector 20 controls the fuel to oxidizer ratio for optimum efficiency in both rocket and airbreathing modes of operation. In rocket mode, additional oxidizer is injected and afterburns in the gas generator 46 resulting from the fuel rich products of the solid fuel grain 16 burning with the oxidizer 14 injected from the upstream liquid oxidizer injector 18. In an airbreathing mode of operation, it is the net unburned fuel exhausting from the primary rocket nozzle 24 that is used for combustion in a ramjet combustor 26 with air provided by the inlet system 22 and the ram pressure generated by supersonic flight speeds. The oxidizer flow from the upstream liquid oxidizer injector 18 generates this required available fuel flow for the ramjet operation, and provides the highest ramjet Isp. Little or no oxidizer injection is required from the downstream liquid oxidizer injector 20 while in an airbreathing mode.

Figure 2:
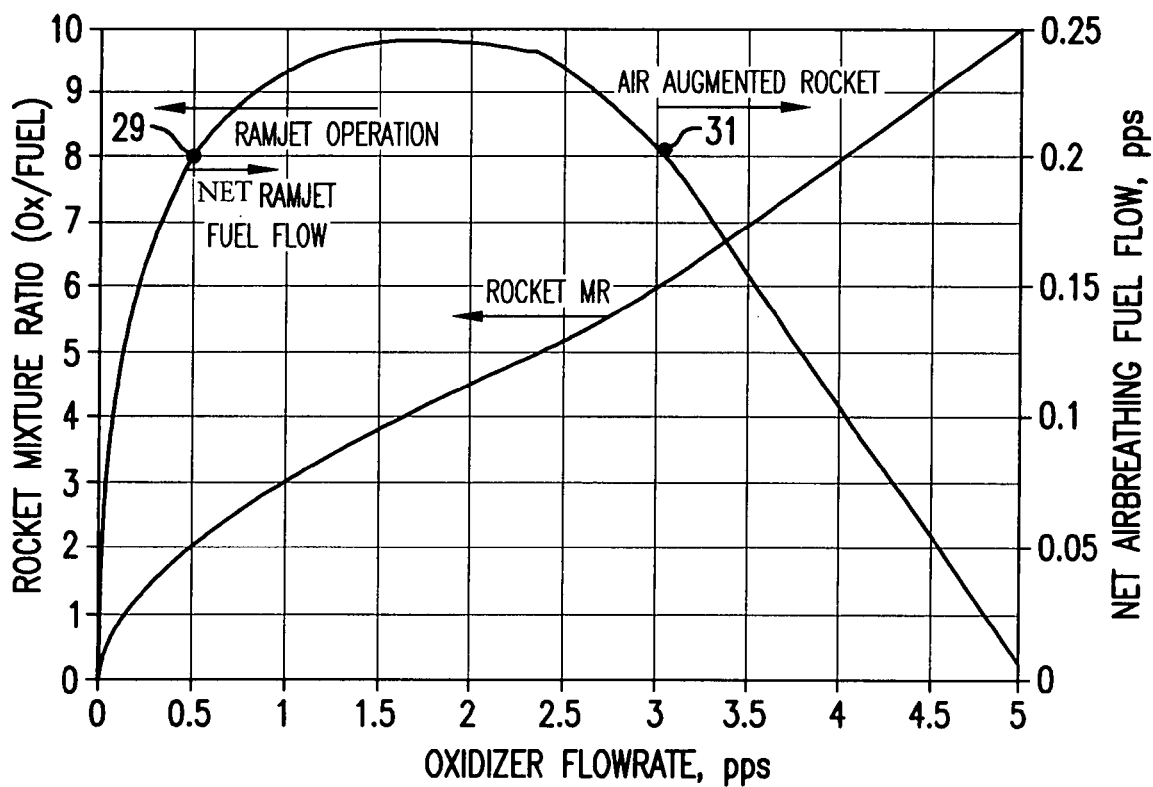
FIG. 2 graphically illustrates how the fuel flow and fuel to oxidizer ratio is varied to support the various cycles of the mission.

FIG. 2 graphically illustrates how the hybrid engine (12 in FIG. 1) may be operated at widely varying fuel flow rates and fuel to oxidizer ratios to provide optimum efficiency in both the rocket mode and the ramjet mode of operation. For maximum efficiency in ramjet mode of operation, the required fuel flow for combustion should be produced with the minimum flow of oxidizer. The net fuel flow curve illustrated in FIG. 2 rises rapidly with the oxidizer flow due to the non-linearity of the hybrid fuel regression process. Since the oxidizer consumes some portion of the gross fuel flow, the net fuel flow peaks and falls after a certain amount of oxidizer flow has been delivered. Once past this peak, the downstream injector (20 in FIG. 1) is activated to increase the oxidizer flow to consume the fuel even faster for rocket-like operation (high oxidizer to fuel ratios). If the ramjet demands a net fuel flow of 0.2 pounds per second, the curve has two points that satisfy that requirement. The first would be at a low oxidizer flow of 0.5 pounds per second (reference point 29) and the second point would be with high oxidizer flow of 3.0 pounds per second (reference point 31). The first point 29 would be a ramjet mode of operation with a high Isp and thrust sufficient to operate at moderate acceleration. The second point 31 would represent an air augmented rocket (AAR) mode with additional thrust produced by higher consumption of fuel and oxidizer in the gas generator (46 in FIG. 1) producing additional rocket thrust contribution. Most of the ramjet operation would be performed at even lower oxidizer flowrates. Most of the AAR mode would be performed at higher oxidizer flowrates. This illustrates how our dual injection system can satisfy two vastly different modes of operation.

Figure 3:
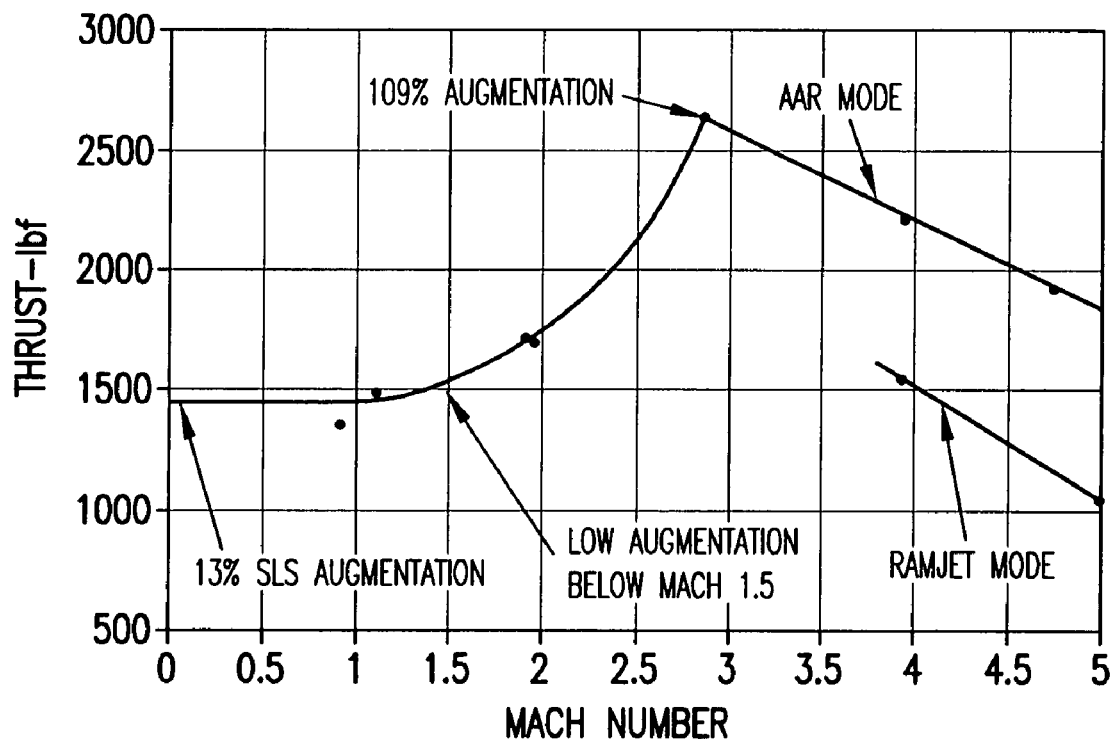
FIG. 3 graphically illustrates thrust as a function of Mach Number for an air augmented rocket accelerating from sea level static (SLS) to Mach 5.

An air augmented rocket (AAR) when properly designed will use the airflow induced into the engine to produce more thrust (augmentation) than would be produced by the rocket acting alone. This known propulsion system has also been referred to variously as a ducted rocket, ejector ramjet (ERJ) and an AAR. As is known, the air augmentation can be positive even at zero speed due to ejector pumping of the primary rocket jet acting on the inlet airstream. FIG. 3 graphically illustrates data from an AAR test from sea level static to Mach 5 and high altitude. Augmentation is low until a flight speed of Mach 1.5 is exceeded. This is due to the low ram pressure at low supersonic speeds. Above Mach 1.5, the augmentation rises rapidly and can be in excess of 100%, twice the rocket only thrust.

Figure 4:
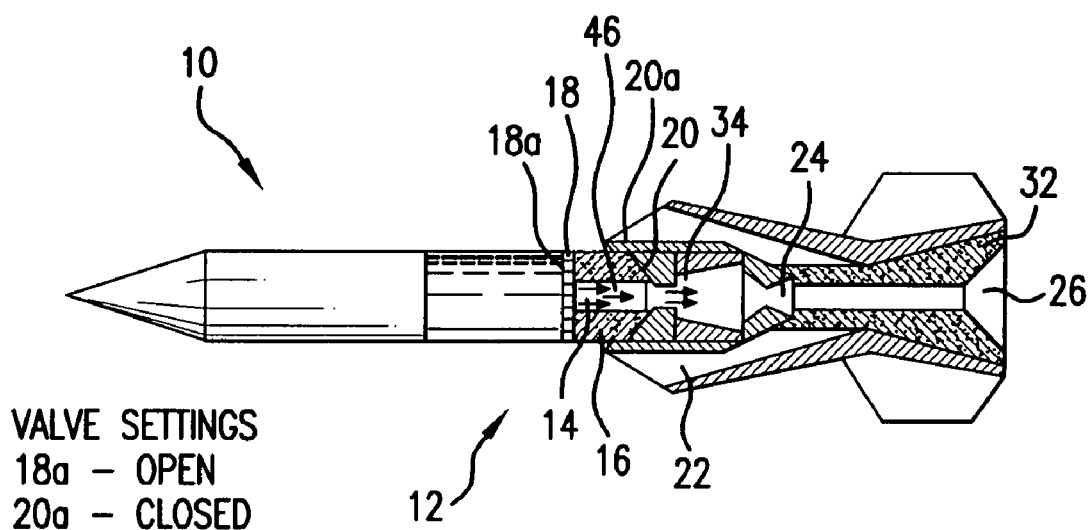
FIG. 4 illustrates a missile propelled by an integral reverse hybrid rocket during a first mode of operation in accordance with a first embodiment of the invention.

Notice in FIG. 1 that the ramjet combustor 26 is substantially empty, functioning only as an afterburner for the AAR mode and a primary combustor for the ramjet mode. The ramjet combustor can be initially filled with solid propellant to provide the boost to ramjet take over. This configuration is referred to as an Integral Rocket Ramjet or IRR system. One limitation of prior art IRR systems is a necessity to increase the wall thickness of the ramjet combustor to withstand the higher rocket pressures and lengthen it to provide sufficient booster propellant to accelerate the missile to ramjet takeover speed. With reference to FIG. 4, we can use the ramjet combustor 26 largely as is. A small amount of boost propellant 32 is cast in the ramjet combustor coating interior surfaces of the combustor. Cast boost propellant 32 is, however, insufficient to boost the missile to ramjet takeover and we thus refer to it as a "Fractional Booster". After this boost propellant 32 burns out, the missile is only traveling at low supersonic velocity (approximately Mach 1.5). The balance of the boost to ramjet takeover approximately Mach 2.5-3, is effected by the AAR mode. Another distinction of our Fractional Booster over the prior art IRR booster, is that we do not use a conventional rocket propellant with the intimate mixture of fuel and oxidizer and its attendant hazards. Our Fractional Booster propellant is mostly oxidizer with a binder that will not sustain combustion without the hot, fuel rich, gases 34 coming from our dual injector hybrid rocket gas generator 46. Our Fractional Booster is thus a "reverse hybrid" with the solid boost propellant 32 being oxidizer rich and the injected fuel rich gas 34 propellant being fuel rich when in the Fractional IRR Booster mode. A representative oxidizer for the Fractional Booster is ammonium perchlorate and a representative binder is a hydroxyl-functional liquid, such as hydroxyl terminated polybutadiene (HTPB).

This propulsion system is configured to operate in up to five modes. A first embodiment represents a subsonic combustion system and a second embodiment is more suitable for supersonic combustion operation.

FIG. 4 shows the motor 12 in integral reverse hybrid rocket (IRHR) mode of operation in accordance with the first embodiment. This mode is used for initial acceleration of the missile 10 up to a speed where the second mode, the air augmented hybrid rocket mode, can be efficiently operated. The propulsion system is initiated by opening the forward liquid oxidizer injector 18a control valve and the liquid oxidizer 14 is sprayed onto the solid fuel 16. Ignition is by any of a number of conventional means such as a small pyrotechnic squib or catalysts exposed to the oxidizer flow. Once ignited, the combustion of the fuel in the hybrid gas generator 46 creates a very fuel-rich hot exhaust gas 34 that passes over submerged aft liquid oxidizer injector 20 and into the primary rocket nozzle 24 where the gases are accelerated to a low supersonic velocity and enter the ramjet combustor 26 initially filled with oxidizer rich boost propellant 32. The contact of the hot fuel-rich exhaust gases 34 with the oxidizer rich boost propellant 32 causes the mass flux of oxidizer driven from the surface to mix with and react with the fuel rich gases significantly increasing the pressure in the port and thus the thrust of the combined cycle engine. With the air inlet 22 blocked by unconsumed oxidizer rich boost propellant 32 during this mode of operation, this mode of operation is technically an afterburning rocket like the Aerojet-General Corporation (Sacramento, Calif.) LOX Augmented Nuclear Thermal Rocket (as disclosed in "A Revolutionary Lunar Space Transportation System Architecture Using Extraterrestrial LOX-Augmented NTR Propulsion", AIAA Joint Propulsion Meeting, Jun. 27-29, 1994) or the Thrust Augmented Rocket (as disclosed in U.S. Pat. No. 6,568,171). In the afterburning rocket prior art, thrust increases in excess of 100% over the primary rocket are readily achieved. This provides high missile acceleration for the initial boost. When compared to a conventional IRR at the same net thrust, the pressure in the ram burner is lower with the Factional Booster due to the larger effective throat area. This reduces the weight of the ramjet combustor 26.

Figure 5:
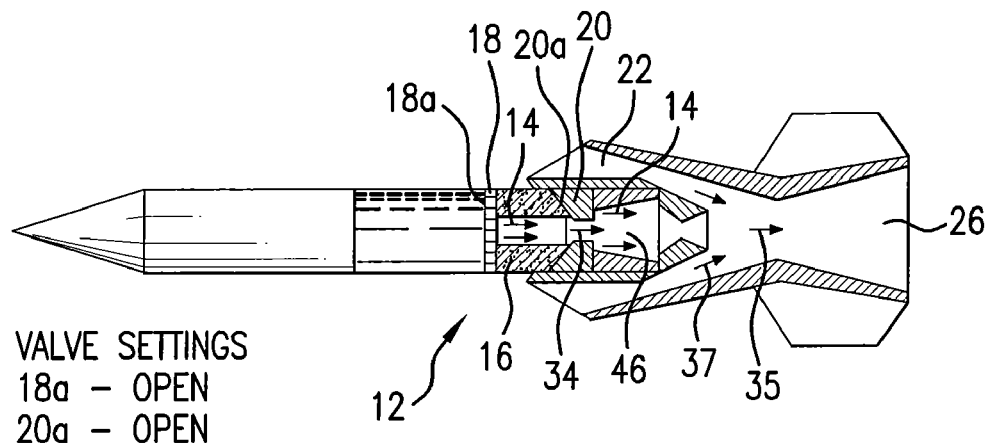
FIG. 5 illustrates the missile of FIG. 4 propelled by an air augmented hybrid rocket during a second mode of operation.

FIG. 5 shows engine 12 in an air augmented hybrid rocket (AAHR) mode of operation which provides additional boost to ramjet takeover. The propulsion system transitions to this mode as the IRHR solid oxidizer burns out and the air inlet 22 ports are opened by any conventional means such as consumable membranes that are exposed to the hot gas as the IRHR propellant regresses. This enables a flow of air to mix with the combustion products downstream of the rocket nozzle. Without the AAHR oxidizer, the thrust decreases to a fraction of the desired level. At a speed of approximately Mach 1.5 or higher, the inlet airflow and air augmentation are beginning to rise but are still low. To restore lost thrust, the aft liquid oxidizer injector 20*a* control valve is opened and the liquid oxidizer 14 is sprayed into the aft end of the hybrid gas generator 46. During the IRHR operation, these aft injector struts have been exposed by the recession of the hybrid fuel. The oxidizer mass addition and the more complete combustion of the hybrid fuel-rich exhaust gas 34 moves the fuel to oxidizer ratio and chamber pressure to values more suitable to efficient high thrust rocket operation.

The aft liquid oxidizer injector 20 struts are designed so as to initially inject the oxidizer near the solid fuel 16 port surface. This reduces the unburned fuel on the primary plume boundary during low AAHR mode to avoid a premature thermal blockage to the inlet airstream resulting in inlet unstart. The bulk of the net available fuel is contained within the jet and is only made available for combustion with the air after sufficient mixing distance where the duct area has increased sufficiently to allow the additional heat release. As the solid fuel 16 surface regresses further, this design allows for a passive increase in the amount of available fuel on the primary jet boundary.

The quantity of residual fuel 35 dispersed in the hybrid rocket jet plume is controlled so as to be sufficient for combustion in the ramjet combustor 26 with the inlet airflow 37. The primary rocket jet pumps the incoming air which is diffused and then afterburned as normally achieved in the prior art ejector ramjets. As the airflow increases as the speed increases, the oxidizer flow from the aft liquid oxidizer injector 20 is reduced in concert with the forward liquid oxidizer injector 18 flow to control the total propellant flow and its mixture ratio to maximize the effective Isp [(Thrust−Drag)/propellant flow] or to maximize thrust in the remaining AAHR acceleration. In general, this results in a continuous reduction in total oxidizer flow.

Figure 6:
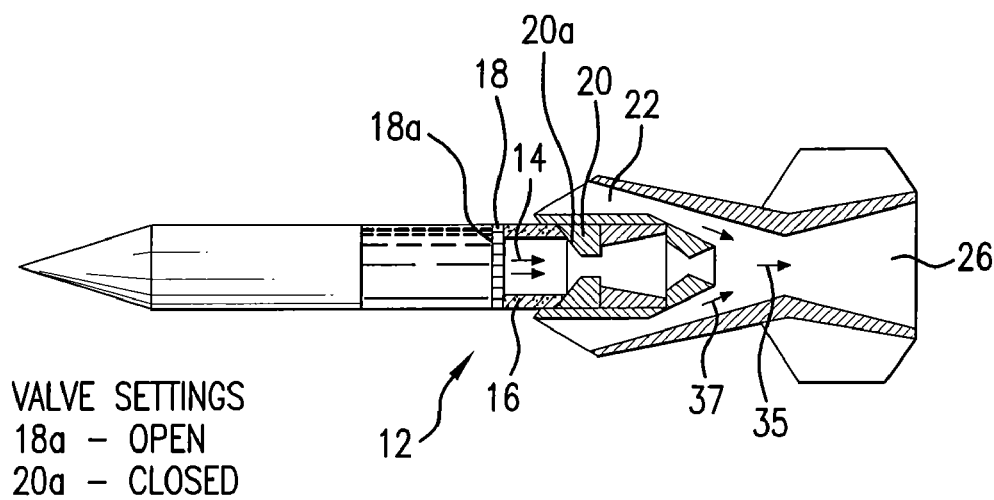
FIG. 6 illustrates the missile of FIG. 4 propelled in a ramjet mode of operation.

FIG. 6 shows the rocket engine 12 in a ramjet (RJ) mode of operation. The propulsion system transitions to RJ mode when the ramjet operation becomes the most effective propulsion for the mission. In the RJ mode of operation, the oxidizer flow from the aft liquid oxidizer injector 20 is off or at a low level. The fuel flow for the required ramjet thrust is controlled by the forward liquid oxidizer injector 18 oxidizer 14 flowrate. The ramjet fuel flowrate is dependant on the missile altitude, speed and thrust demand (acceleration or cruise). The maximum to minimum net fuel flow may be in excess of 10:1. Unlike prior art ramjet missiles, the transition from AAHR to RJ is continuous and non-critical. The air inlet 22 ports were opened when the AAHR mode began and ignition of the ramjet solid fuel 16 is well established before the end of the AAHR mode. The combustor 26 geometry is a diverging, thermally choked configuration with many advantages including the ability to operate with Supersonic Combustion (Scramjet) or Dash Modes. For missiles designed to stay below about Mach 6 and stay within the sensible atmosphere, a mechanical throat (not shown) may be used.

Figure 7:
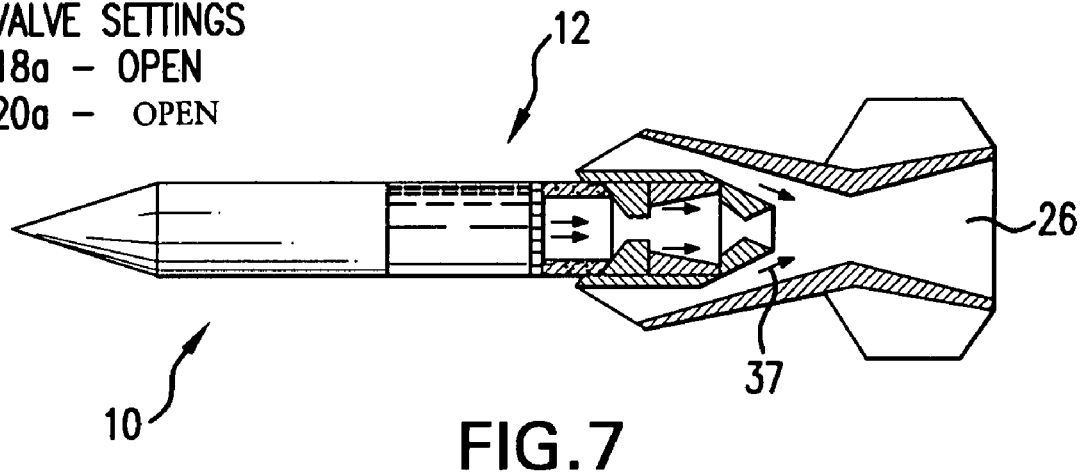
FIG. 7 illustrates the missile of FIG. 4 in a mode of operation suitable when additional thrust is required or propulsion is required outside the useable atmosphere.

FIG. 7 shows the missile 10 with the engine 12 in dual injector hybrid rocket (DIHR) mode of operation which is a suitable mode when operation is outside the usable atmosphere, or when additional thrust within the atmosphere is required. This mode is similar to the AAHR mode using the Dual Injector Hybrid rocket engine applied whenever additional thrust is required during the mission. This additional thrust is very advantageous for end game maneuvers where a conventional ramjet missile may lose energy too fast or for flying out of the atmosphere where ramjet or scramjet operation become untenable. The diverging combustor 26 geometry shown in these figures is efficient for use in this mode at high altitudes where airflow into the combustor is minimal. In near vacuum conditions a mechanical or second throat would reduce the engine performance due to shocks that would form as the supersonic primary jet impinges on the re-contracting geometry.

Figure 8:
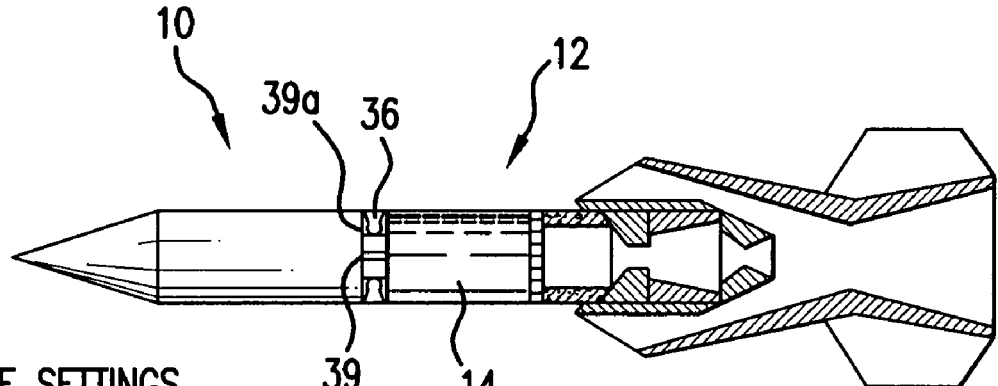
FIG. 8 illustrates the missile of FIG. 4 in mono-propellant rocket mode of operation effective to generate lateral thrust for steering.

FIG. 8 shows missile 10 with engine 12 in mono-propellant divert rocket (MPDR) mode of operation. This mode is used for steering the missile to hit to kill exoatmospheric interceptors where aerodynamic controls are ineffective. This controlled, lateral thrust is generated by using small circumferential thrusters 36 embedded near the center of gravity (CG) of the missile 10 body. A fuel rich hybrid gas can be used but in order to avoid hot gas valving, monopropellant oxidizer 44 is employed flowing to each circumferential thruster 36 controlled by small DAC liquid control valves 39*a* producing oxygen rich rocket jets. Each circumferential thruster 36 has an integral ignition system tailored to the propellant used. Attitude control is required for many reasons such as keeping the missile body and seekers pointed at the projected intercept point. Attitude control can be provided by a number of techniques. If the primary engine is still thrusting, jet deflectors can be used to null out divert thrust induced moments or redirect the vehicle during the terminal phase of the intercept. Alternately, smaller thrusters are placed on the forward or aft of the missile body for the same purposes. The main advantage of this configuration is in the integration of the MPDR with the main propulsion system and elimination of a separate system. Not only does this reduce the propulsion system complexity, but the use of a common propellant system results in greater mission flexibility.

FIGS. 9-12 show a second embodiment of the invention. This configuration has features in common with the first embodiment discussed above and like reference numerals identify like features. This second embodiment is preferred for higher speed operation that utilizes a supersonic combustion ramjet (scramjet) mode. In order to operate in the atmosphere at speeds up to Mach 6 or better, this embodiment employs an inlet and supersonic combustor similar to a dual combustion ramjet (DCR). The hybrid gas generator is reversed and packaged as an annulus around a DMRJ combustor.

Figure 9:
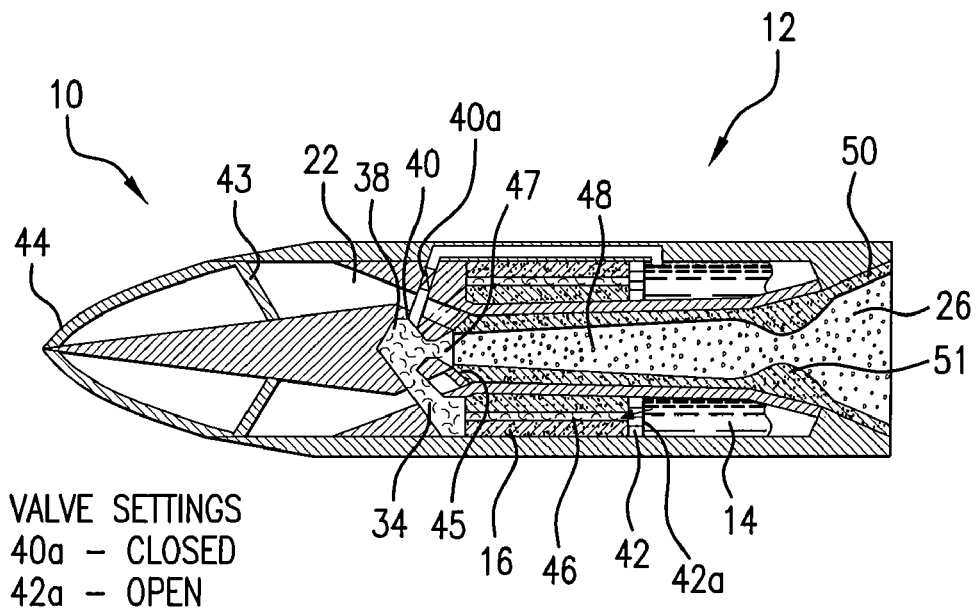
FIG. 9 illustrates a missile propelled by an integral reverse hybrid rocket during a first mode of operation in accordance with a second embodiment of the invention.

FIG. 9 shows a missile 10 propelled by an engine 12 in accordance with the second embodiment in a fractional IRHR mode of operation, as would be employed to initiate a mission. Hybrid engine 12 includes liquid oxidizer 14 and solid fuel 16. A central rocket chamber 38 includes downstream liquid oxidizer injector 40 and associated valve 40*a*. Upstream liquid oxidizer injector 42 is disposed between liquid oxidizer 14 and solid fuel 16. Air inlets 22, that extend from a nose end 43 to a body end 45, terminate at a centerline scramjet combustor 48. The air inlets 22 are initially blocked by an air inlet cover 44.

The propulsion system is initiated by opening the upstream liquid oxidizer injector 42 control valve and the liquid oxidizer 14 is sprayed into an annular hybrid gas generator 46 with multiple ports for gas generation and flow. Ignition is as before. Once ignited, the combustion of the fuel in the annular hybrid gas generator 46 creates very fuel-rich hot exhaust gases 34 that flow forward and through the inlet struts into the central rocket chamber 38 and central rocket nozzle 47 where the gases are accelerated to a low supersonic velocity and enter the centerline scramjet combustor 48 which is initially filled with an oxidizer rich boost propellant 50. An aft portion 51 of the oxidizer rich boost propellant 50 forms a consumable throat within the combustor 26. The contact of the hot fuel rich gases 34 with the oxidizer rich boost propellant 50 causes the mass flux of oxidizer driven off the surface to mix with and react with the fuel rich gases 34 significantly increasing the pressure in the port and thus the thrust of the combined cycle engine.

Figure 10:
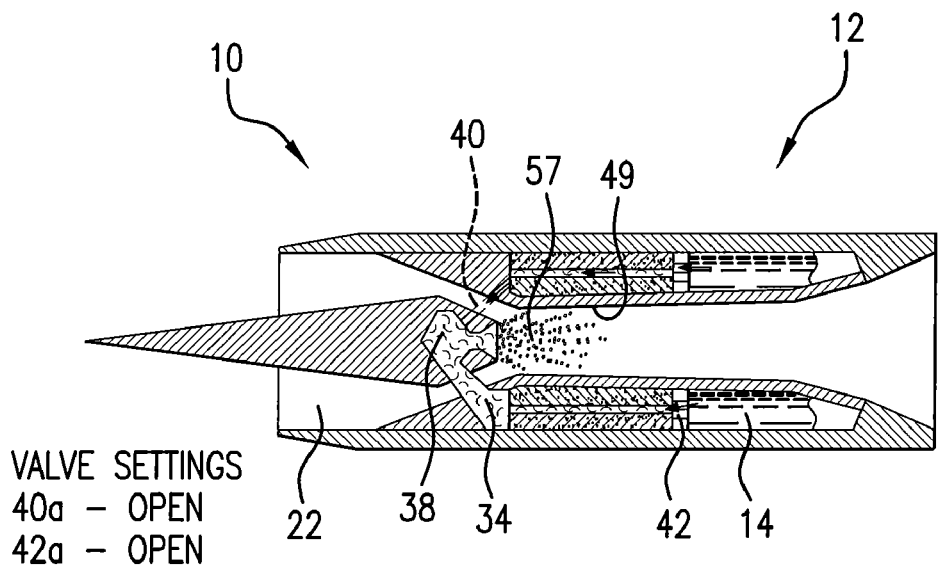
FIG. 10 illustrates the missile of FIG. 9 with the rocket engine in air augmented hybrid rocket mode of operation.

FIG. 10 shows the missile 10 when the rocket engine 12 is in AAHR mode of operation. The propulsion system transitions to AAHR mode as the IRHR mode solid boost propellant oxidizer (50 in FIG. 9) burns out and removal of air inlet cover (44 in FIG. 9) opens air inlets 22. The primary rocket acts as the prior art ejector ramjets. Instead of the downstream liquid oxidizer injectors 40 being uncovered as in the first embodiment, the Scramjet embodiment has the downstream liquid oxidizer injectors placed in the central rocket chamber 38 after the fuel-rich exhaust gases 34 have completed a nominal 180 degree turn within the central rocket chamber 38. This reduces the thermal stress on the inlet struts. The downstream liquid oxidizer injectors 40 are placed so as to inject liquid oxidizer 14 from the chamber wall towards the center. The upstream valves 42a are open an amount effective to provide a required liquid oxidizer 14 flow rate.

This approach also reduces the unburned fuel on the plume boundary 49 during AAHR mode. As the oxidizer flow is decreased at higher speeds, the fuel rich plume core 57 becomes larger and less distance is required to expose this fuel to the air for combustion resulting in faster combustion as the speed increases.

Figure 11:
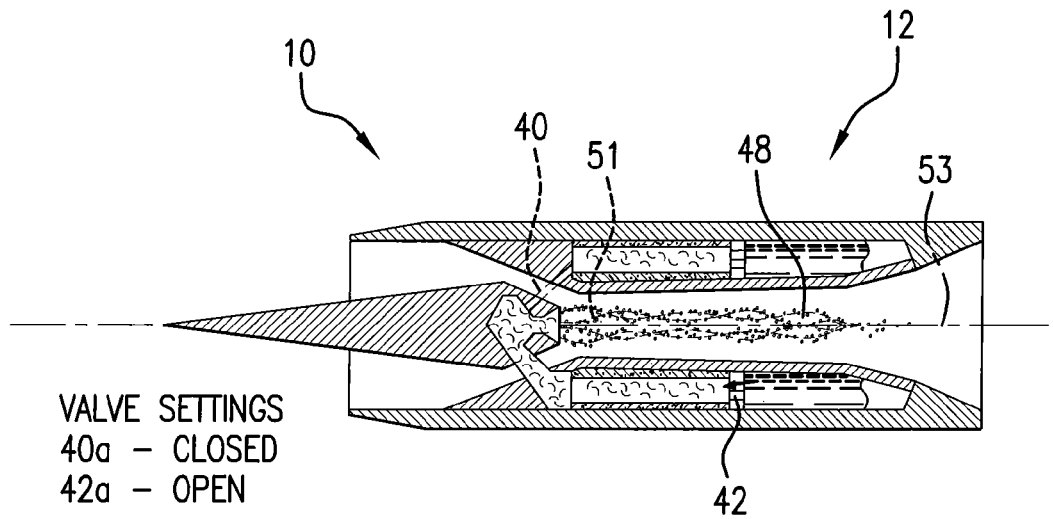
FIG. 11 illustrates the missile of FIG. 9 with the rocket engine in dual mode ramjet (DRMJ) mode of operation.

FIG. 11 shows the missile 10 with the engine 12 in DMRJ mode of operation. The propulsion system transitions to this mode as with the first embodiment by turning off the downstream liquid oxidizer injector 40. Scramjet operation is achieved when the speed and fuel flow conditions allow supersonic conditions to persist on the combustor 48 centerline 53. At speeds above Mach 5-6, scramjet operation is thermodynamically superior to a subsonic combustion mode. This transition occurs naturally without need for active control.

Figure 12:
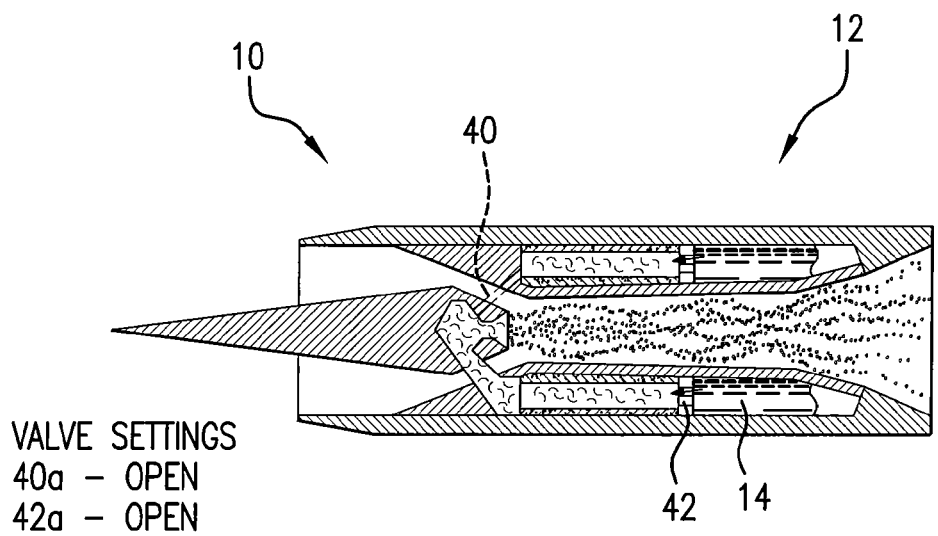
FIG. 12 illustrates the missile of FIG. 9 with the rocket engine in dual injector hybrid rocket mode of operation.

FIG. 12 shows the missile 10 with engine 12 in dual injector hybrid rocket (DIHR) mode of operation. This mode of operation is similar to the first embodiment and achieved by turning the downstream liquid oxidizer injectors 40 back on to return to the dual injected hybrid rocket function.

FIG. 13 shows the missile 10 with rocket engine 12 in MPDR mode. The concept is similar to the previous embodiment except the circumferential thrusters 36 are packaged in an annular space surrounding the scram combustor 48. Attitude control options are the same as for the first embodiment.

One or more embodiments of the present invention have been described. Nevertheless, it will be understood that various modifications may be made without departing from the spirit and scope of the invention. For example, different inlet types, such as a single chin inlet can be employed without deviating from the invention. Accordingly, other embodiments are within the scope of the following claims.

What is claimed is:

1. An insensitive combined cycle missile propulsion system, comprising:
    a first section of said missile having an upstream end and an opposing downstream end with a solid fuel contained therein, said sold fuel having an opening extending therethrough;
    a second section of said missile containing a liquid oxidizer adjacent said upstream end with a first liquid oxidizer injector disposed therebetween;
    a first conduit adjacent said downstream end having a shaped bend effective to change a direction of flow of combustion products of said solid fuel and said liquid oxidizer by about 180°;
    a second conduit having a second liquid oxidizer injector extending from said second section to a point downstream of said shaped bend;
    a rocket nozzle downstream of said second liquid oxidizer injector effective to exhaust combustion products resulting from combustion of said solid fuel and said liquid oxidizer into a combustor;
    an oxidizer rich boost propellant coating interior walls of said combustor; and
    an obstructed air inlet having a nose end and a body end with said body end terminating at said combustor.

2. The propulsion system of claim 1 wherein said nose end of said air inlet is obstructed by an air inlet cover and said body end of said air inlet is obstructed by said oxidizer rich boost propellant.

3. An insensitive combined cycle missile propulsion system, comprising:
    a fuel contained within a first section of said missile;
    an oxidizer contained within a second section of said missile, wherein one of said fuel and said oxidizers are a liquid until consumed during flight of said missile and the other of said fuel and said oxidizer is a solid until consumed during flight;
    a first conduit having a first valve communicating said fuel and said oxidizer;
    a second conduit, spatially removed from said first conduit having a second valve communicating said fuel and said oxidizer;
    a rocket nozzle downstream of said first valve and said second valve effective to exhaust combustion products resulting from combustion of said fuel and said oxidizer into a combustor, an oxidizer rich boost propellant coating an interior surface of said combustor: and
    an obstructed air inlet having a nose end obstructed by an air inlet cover and a body end obstructed by said oxidizer rich boost propellant wherein said oxidizer rich solid propellant further forms a consumable throat within said combustor.

* * * * *